United States Patent [19]
Anderson

[11] 3,836,751
[45] Sept. 17, 1974

[54] TEMPERATURE CONTROLLED PROFILING HEATER

[75] Inventor: Emmett R. Anderson, Saratoga, Calif.

[73] Assignee: Applied Materials, Inc., Santa Clara, Calif.

[22] Filed: July 26, 1973

[21] Appl. No.: 382,738

[52] U.S. Cl................ 219/411, 219/351, 219/354, 219/405, 219/413
[51] Int. Cl............................................ F27d 11/02
[58] Field of Search .......... 219/210, 385, 405, 388, 219/411, 412, 413, 516, 530, 540, 553, 345, 348, 350, 351, 354; 13/24

[56] References Cited
UNITED STATES PATENTS

| | | | |
|---|---|---|---|
| 2,756,319 | 7/1956 | Hatch | 219/405 X |
| 3,114,822 | 12/1963 | Boland | 219/405 X |
| 3,183,294 | 5/1965 | Kasper | 13/24 X |
| 3,240,915 | 3/1966 | Carter et al. | 219/343 |
| 3,244,859 | 4/1966 | Whiteford | 219/348 X |
| 3,249,741 | 5/1966 | Mills | 219/411 X |
| 3,304,406 | 2/1967 | King | 219/411 |
| 3,381,114 | 4/1968 | Nakanuma | 219/385 |
| 3,515,854 | 6/1970 | Williams | 219/388 |
| 3,601,582 | 8/1971 | Boisfleury | 219/405 X |
| 3,717,439 | 2/1973 | Sakai | 219/385 X |

Primary Examiner—Volodymyr Y. Mayewsky
Attorney, Agent, or Firm—Flehr, Hohbach, Test, Albritton & Herbert

[57] ABSTRACT

Heater for producing and maintaining a desired temperature profile along angularly displaced axes. The heater includes a pair of radiant heat sources each having a plurality of heating elements spaced along an axis outside a chamber fabricated of a material which is transparent to the heat energy produced by the heating elements, thermal sensors for monitoring the temperature in regions disposed on angularly displaced axes within the chamber, and means for adjusting the amount of heat energy produced by the heating elements to maintain a desired temperature in each region.

14 Claims, 6 Drawing Figures

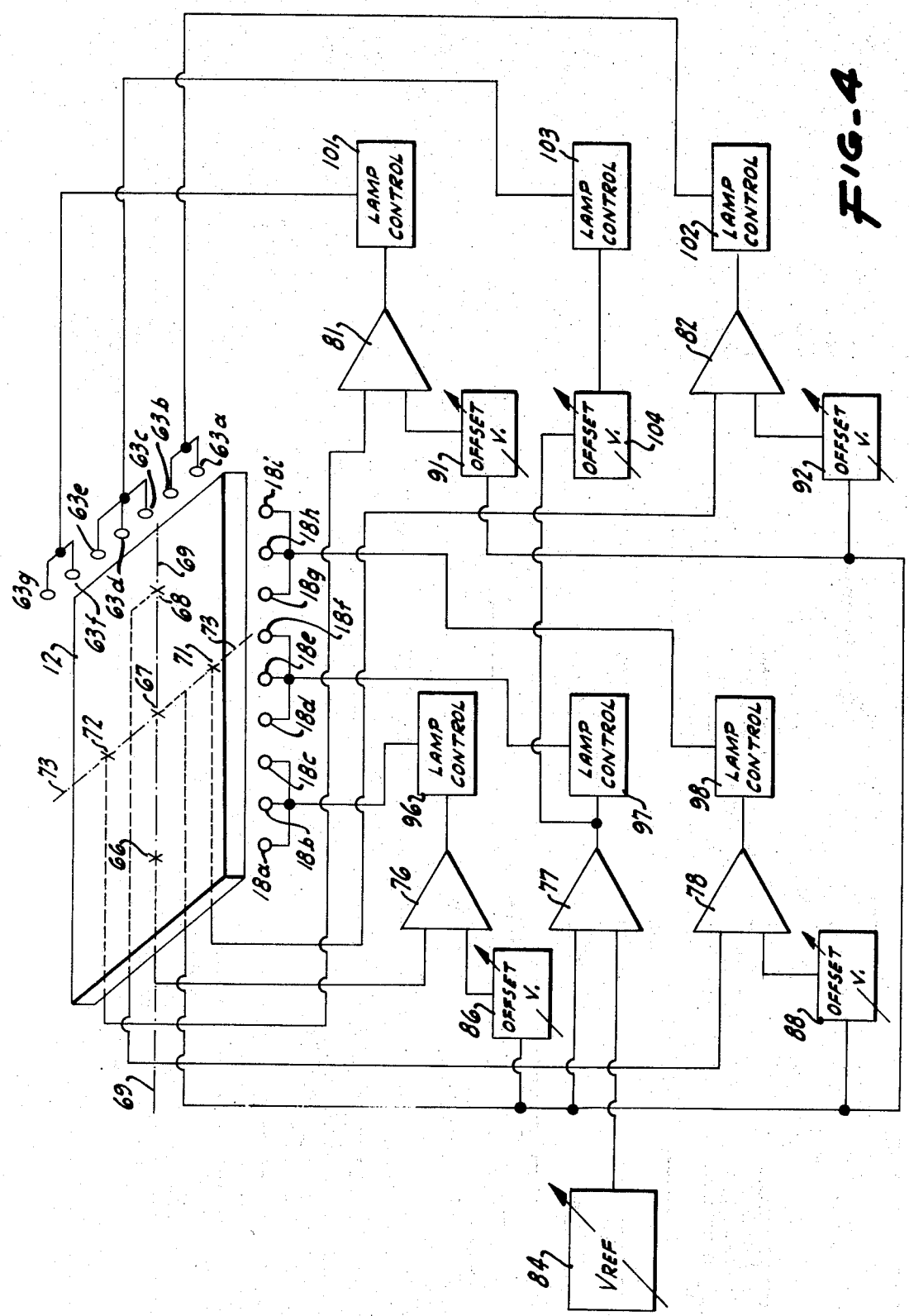

TEMPERATURE CONTROLLED PROFILING HEATER

BACKGROUND OF THE INVENTION

This invention pertains generally to heating apparatus and more particularly to a temperature controlled profiling heater for producing a predetermined temperature profile along angularly displaced axes.

The invention has particular utility in reactors of the type used in vapor deposition of films on substrates in the manufacture of semiconductors. In such reactors, gaseous chemical reactants are brought into contact with heated substrates within the reaction chamber. The substrates to be coated are generally supported by a susceptor, and the substrates and/or the susceptor are heated by energy from a heat source located externally of the chamber. In such reactors, it is important that the susceptor and substrates are heated uniformly.

The invention also has application in strip steel mills and belt furnaces where a material to be treated is passed through a hot zone. In strip steel mills, the material is commonly wound on supply and take-up reels within the chamber, or it passes through slots provided with locks in the walls of the chamber. In belt furnaces, the material is conveyed by a belt which generally passes through slots with locks in the chamber walls. In such devices, it is generally desirable to maintain a uniform temperature normal to the direction of travel, and depending upon the particular application, it may be desirable to provide either a uniform temperature or a predetermined thermal gradient in the direction of travel.

SUMMARY AND OBJECTS OF THE INVENTION

The invention provides a heater for producing and maintaining a desired temperature profile along angularly displaced axes. The heater includes a chamber having at least one wall formed of a material which is transparent to heat energy of a predetermined wavelength, a plurality of radiant heating elements outside the chamber for producing heat energy of the predetermined wavelength and transmitting the energy through the wall to different regions within the chamber, thermal sensing means for sensing the temperature in each of the regions, and means for adjusting the amount of heat produced by the elements to provide a predetermined temperature in each of the regions in the chamber. The means for adjusting the amount of heat includes means responsive to the thermal sensing means for maintaining the temperature in each region at a predetermined level. Air passages are provided for directing air to the heating elements and chamber walls to cool them. In one preferred embodiment, the heating elements are spaced along angularly displaced axes, and the thermal sensors are spaced along axes parallel to the axes of the heating elements.

It is in general an object of the invention to provide a new and improved heater for producing a desired temperature profile along angularly displaced axes.

Another object of the invention is to provide a heater of the above character which includes a plurality of radiant heating elements and means for adjusting the heat produced by the elements to provide a desired temperature profile.

Another object of the invention is to provide a heater of the above character which includes means for sensing the temperatures produced by the heating elements in different regions and maintaining the temperatures at predetermined levels.

Additional objects and features of the invention will be apparent from the following description in which the preferred embodiments are set forth in detail in conjunction with the accompanying drawings.

BRIEF DESCRIPTION OF THE DRAWINGS

FIG. 4 is a circuit diagram of a control circuit for use in the apparatus shown in FIGS. 1–3.

DESCRIPTION OF THE PREFERRED EMBODIMENTS

Figure 5:
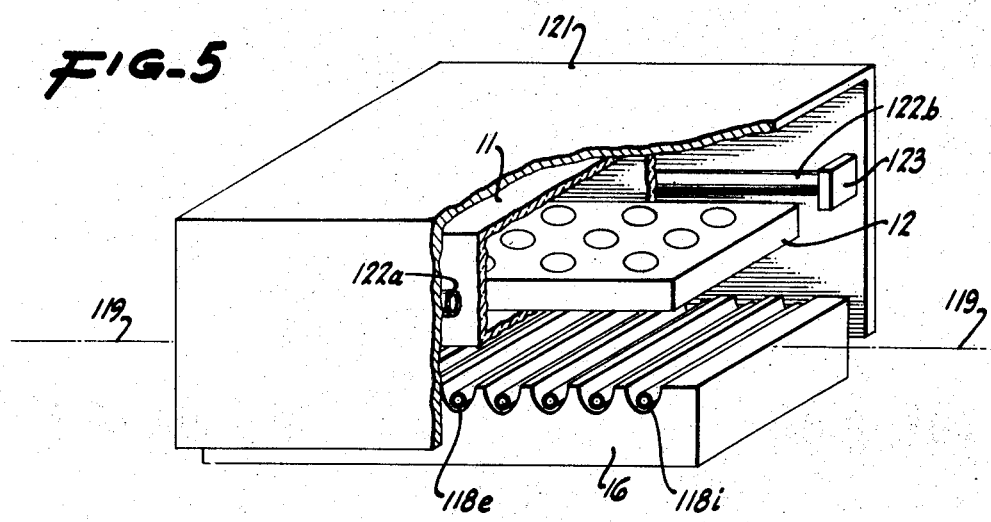
FIG. 5 is a perspective view, partly broken and largely schematic, of another embodiment of apparatus according to the invention.

In the drawings, the apparatus is shown in generally schematic fashion, and only those portions necessary to illustrate the inventive concepts disclosed herein have been included. It is to be understood that the apparatus is intended to be enclosed within and supported by a surrounding enclosure (not shown) in and on which necessary gaseous reactant flow controls, electrical power sources, and other attendant mechanisms are intended to be housed and mounted.

Figure 1:
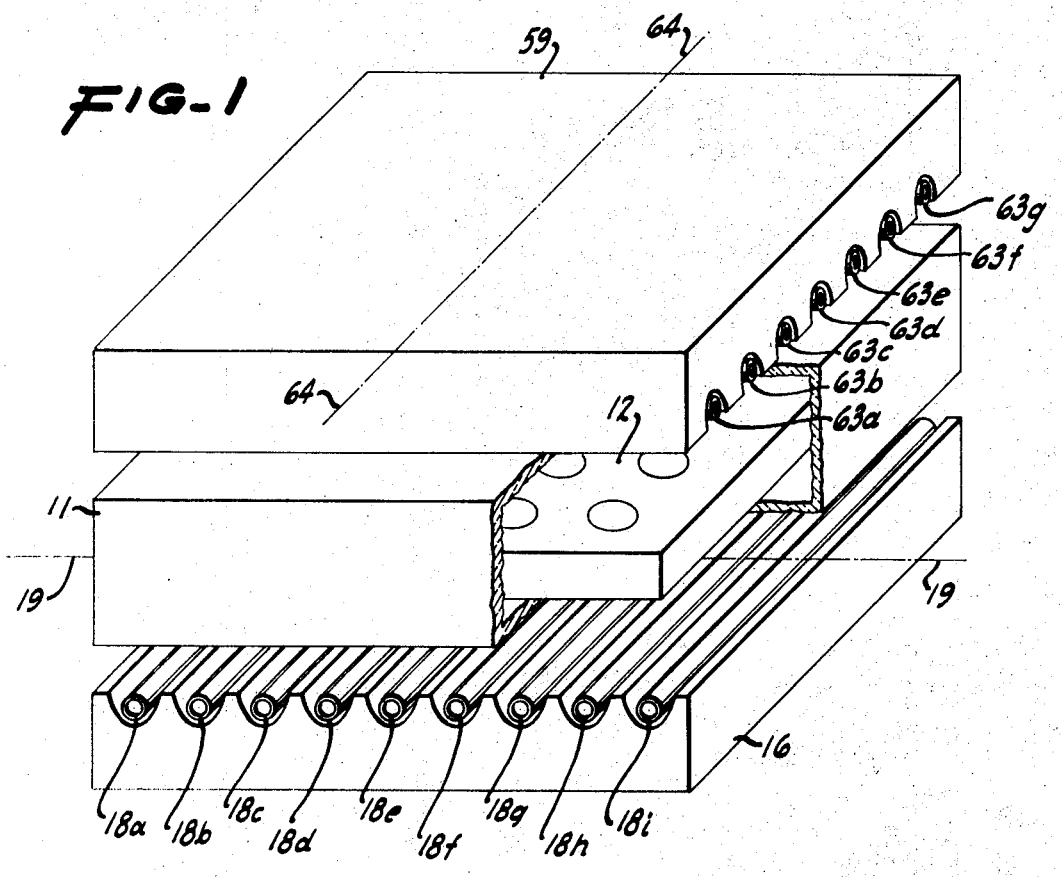
FIG. 1 is a perspective view, largely schematic and partly broken, of one embodiment of apparatus according to the invention.
Figure 2:
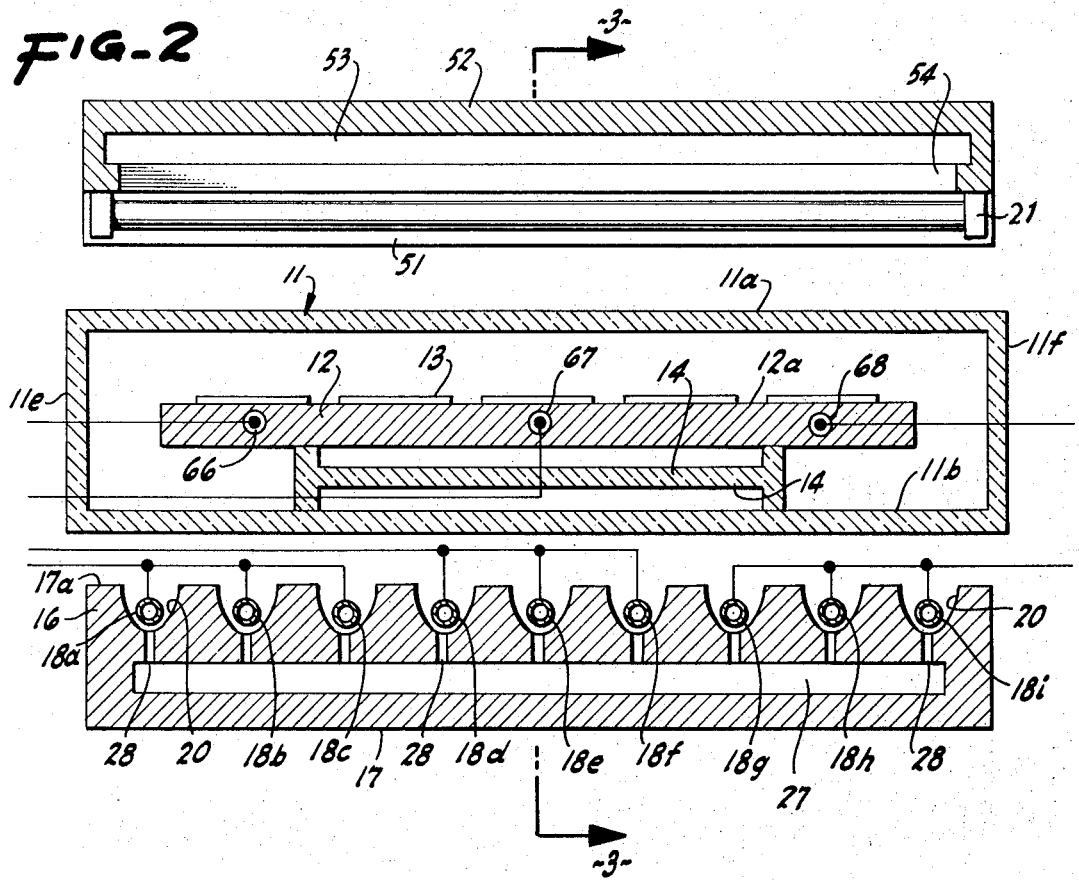
FIG. 2 is a longitudinal sectional view, largely schematic, of the apparatus shown in FIG. 1.
Figure 3:
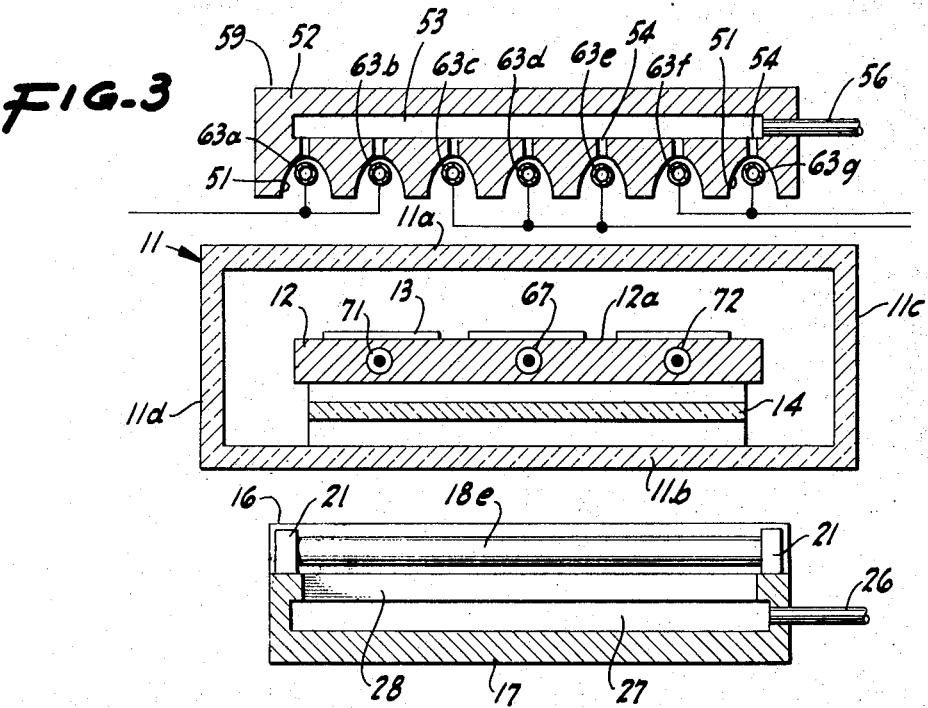
FIG. 3 is a vertical sectional view taken in the plane of line 3—3 in FIG. 2.

The embodiment shown in FIGS. 1–3 includes a reaction chamber 11 having a top wall 11a, a bottom wall 11b, a front wall 11c, a rear wall 11d, and end walls 11e and 11f. These walls are fabricated of a material which is transparent to radiant heat energy produced by the heat sources described below, and in the preferred embodiment, the walls are fabricated of a material such as quartz which is transparent to radiant heat energy having a wavelength on the order of one micron. Suitable access doors (not shown) can be provided in one or more of the walls to provide access to the interior of the chamber.

A slab-like susceptor 12 having a generally planar surface 12a for supporting semiconductor wafers 13 and the like is disposed within chamber 11. Preferably, the susceptor is supported above the bottom wall of the chamber, and for that purpose an elongated H-shaped stand 14 is provided. This stand is preferably fabricated of a material, such as quartz, which is transparent to heat energy of the wavelength produced by the heat sources. The susceptor is fabricated of a material which is opaque to the heat energy emitted from the heat sources, and in the preferred embodiment, the susceptor is made of graphite which readily absorbs and conducts radiant energy at the short wavelength noted. It is not necessary that the susceptor be electrically or thermally conductive, but the use of a thermally conductive susceptor generally results in more uniform heating of the wafers placed thereon.

A first radiant heat source 16 is mounted below bottom wall 11b of the reaction chamber. This heat source includes a generally rectangular block 17 and a plurality of elongated radiant heating elements 18a–18i which are disposed side-by-side along an axis 19 which extends in a direction generally parallel to upper surface 12a of susceptor 12. Block 17 is preferably fabricated of a material such as aluminum, and its upper surface 17a is polished to serve as a reflecting surface. The heating elements are mounted in elongated parabolic recesses 20 formed in the upper surface of block 17. The recesses are highly polished to provide highly reflective surfaces which serve to direct the heat from each heating element to a different region within the chamber.

In the preferred embodiment, heating elements 18a–18i are high intensity tungsten filament lamps having a transparent quartz envelope and a halogen gas, preferably iodine, enclosed therein. The lamps are mounted in sockets 21, and electrical connections are made to the sockets by conventional means, not shown. The lamps produce radiant heat energy of short wavelength, preferably on the order of one micron and this energy is transmitted through the reaction chamber wall without appreciable absorption.

Air circulation means is provided for cooling the heating elements and the bottom wall of chamber 11. This means includes an air inlet 26, a plenum chamber 27 extending longitudinally of block 17, and a plurality of air passageways 28 extending between the plenum chamber and the recesses in which the heating elements are mounted. When inlet 26 is connected to a suitable air source, cooling air flows through plenum chamber 27 and passages 28 to lamps 18a–18i and chamber wall 11b.

A second radiant heat source 59 is mounted above the top wall 11a of the reaction chamber. This heat source is generally similar to heat source 16, and it includes a plurality of radiant heating elements 63a–63g which are disposed side-by-side along an axis 64. This axis is generally parallel to the upper surface of susceptor 12, and it is displaced angularly with respect to axis 19. In the preferred embodiment, axes 19 and 64 are orthogonal to each other. Heating elements 63a–63g are similar to heating elements 18a–18i, and they are mounted in elongated parabolic recesses 51 in a generally rectangular lamp mounting block 52. A plenum chamber 53 and air passageways 54 provide means for cooling heating elements 63a–63g and the top wall of chamber 11. An air inlet 56 communicates with plenum chamber 53 and provides means for connection to a suitable air source.

Thermal sensors 66–68 and 71–72 are provided for sensing the temperature in different regions of the reactor chamber. As illustrated in FIG. 4, sensors 66–68 are spaced along an axis 69 which is generally parallel to axis 19, and sensors 71–72 are spaced along an axis 73 which is generally parallel to axis 64. Sensor 67 is located at the inner section of axes 69 and 73. In the preferred embodiment, the thermal sensors are thermocouples mounted in susceptor 12, and electrical connections are made to the thermocouples by suitable means such as is disclosed in co-pending application Ser. No. 292,992, filed Sept. 28, 1972 and assigned to the assignee herein. If desired, other types of thermal sensors, such as optical sensors, can be utilized in place of the thermocouples.

Means is provided for adjusting the amount of heat produced by the heat sources in different regions of the chamber in accordance with the temperatures sensed by the thermal sensors. This means is illustrated in simplified block diagram form in FIG. 4 as including a plurality of differential amplifiers 76–78 and 81–82 having their negative inputs connected respectively to thermal sensors 66–68 and 71–72. Variable bias voltage sources 86, 88, 91 and 92 are connected to the positive inputs of amplifiers 76, 78, 81 and 82, respectively. Each of the bias sources is also connected to thermal sensor 67, and each is adapted for adding an offset voltage to the signal produced by the sensor. In the perferred embodiment, the bias sources can produce voltages of either polarity, and they provide means for adjusting the temperature in different regions of the chamber either above or below the temperature sensed by sensor 67.

The outputs of amplifiers 76–78 and 81–82 are connected to the inputs of lamp controls 96–98 and 101–102, respectively. The output of amplifier 77 is also connected to the input of another lamp control 103 through another adjustable voltage source 104. The lamp controls serve to control the flow of power from a suitable power source (not shown) to the heating elements. As illustrated controls 96–98 are connected to heating elements 18a–18c, 18d–18f and 18g–18i, respectively. Likewise, controls 101–103 are connected to heating elements 63f–63g, 63a–63b and 63c–63e, respectively.

Operation and use of the apparatus and control systems of FIGS. 1–4 can be described briefly. Assuming that the lamp controls have been connected to a suitable source of power, reference source 84 and bias source 104 are adjusted to provide a desired temperature in the central region of susceptor 12, as monitored by thermal sensor 67. Similarly, bias sources 86, 88, 91 and 92 are adjusted to provide desired temperatures in the regions monitored by sensors 66, 68, 71 and 72, respectively. In the event that the temperature in any region begins to deviate from the desired level, the differential amplifier and lamp control connected to the thermal sensor for that region will adjust the amount of heat produced by the lamps in the region to maintain the temperature at the desired level. For example, if the temperature sensed by sensor 66 should increase, the signal at the negative input of differential amplifier 76 would increase in level relative to the signal at the positive input, and lamp control 96 would reduce the amount of power delivered to heating elements 61a–61c. Similarly, if the temperature sensed by the sensor should decrease, the amount of power delivered to the heating elements will be increased, thereby maintaining the temperature at the desired level.

The control system shown in FIG. 4 is particularly suitable for maintaining the entire susceptor at a uniform temperature since the reference inputs of all of the differential amplifiers except one are connected to the thermal sensor associated with that one amplifier. Since the thermal sensor which provides the reference signals is centrally located, the arrangement is also particularly suitable for producing thermal gradients along axes 69 and 71 centered about the temperature of the central region.

If independent control of the temperature in the different regions is desired, a separate reference source can be connected to the positive input of each of the differential amplifiers. A greater or lesser degree of heat control and resolution can be provided, as desired, by utilizing a different number of temperature sensors and by arranging the lamps in groups of different sizes. The arrangement illustrated has been found to give satisfactory results in chemical vapor deposition reactors, but in a diffusion furnace, for example, it might be desirable to provide a separate thermal sensor for each intersection of heating elements. Likewise, in some applications it may be necessary to use only four temperature sensors. It will be understood, however, that the degree of heat control and temperature resolution increases with the number of sensors and groups of heating elements.

Figure 6:
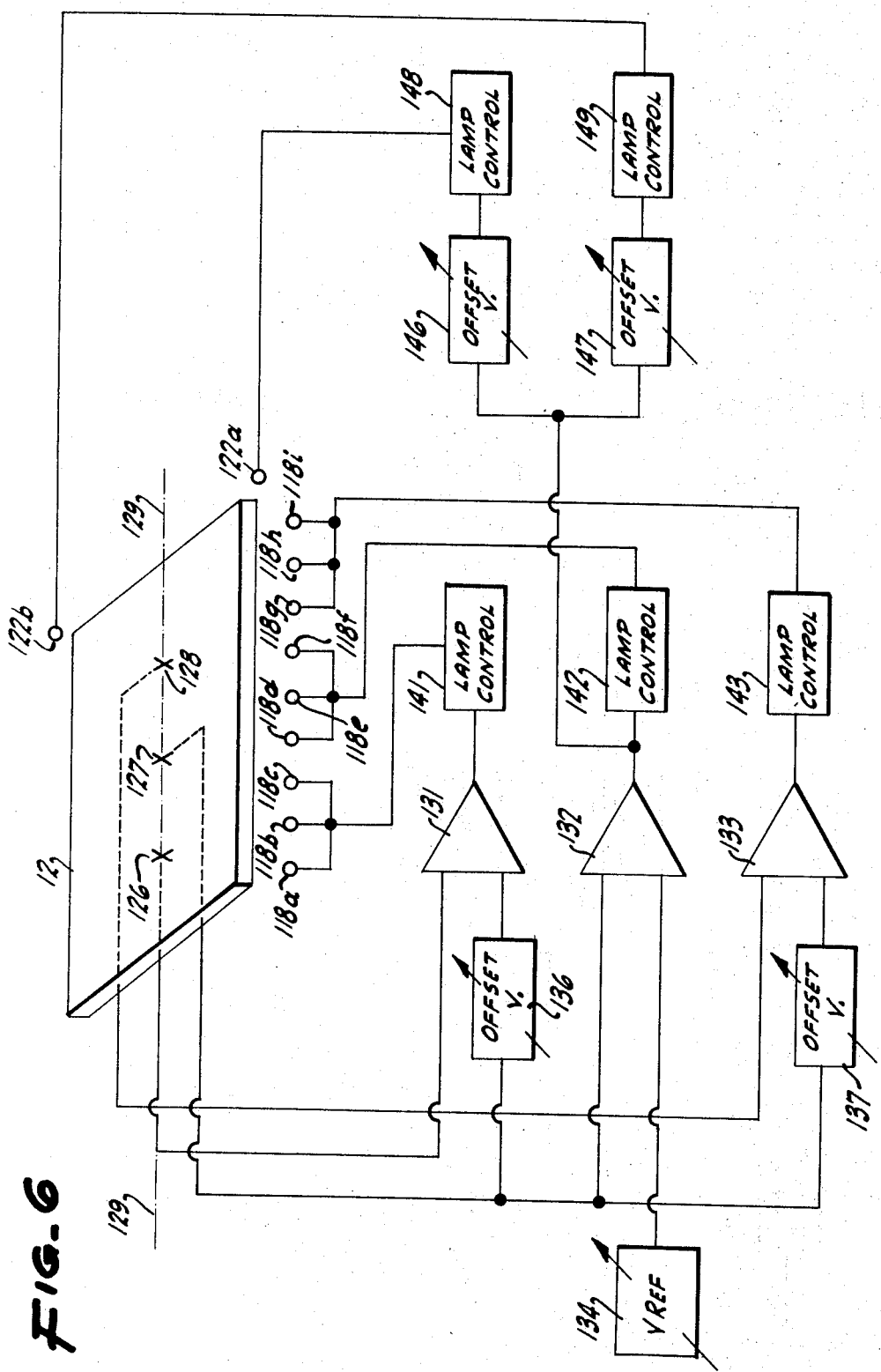
FIG. 6 is a circuit diagram of a control circuit for use in the apparatus shown in FIG. 5.

The embodiment shown in FIGS. 5 and 6 is similar to the embodiment of FIGS. 1–4 in that it includes a reaction chamber 11, a susceptor 12, and a radiant heat source 16 disposed below the reaction chamber. As in the embodiment above, the heat source includes a plurality of radiant heating elements 118a–118i spaced along an axis 119 which is generally parallel to the upper surface of susceptor 12. The embodiment of FIGS. 5 and 6 also includes an elongated U-shaped shroud 121 mounted over the reaction chamber. In the preferred embodiment, the shroud is fabricated of a material such as sheet aluminum, and its inner surfaces are polished to reflect the heat energy produced by the heat source. Additional heating elements 122a and 122b carried by the shroud extend respectively along the front and rear edges of the susceptor, as viewed in FIG. 5. These heating elements are elongated, and they are oriented with their axes generally parallel to the edges of the susceptor and axis 119. In the preferred embodiment, heating elements 122a and 122b are high intensity lamps similar to heating elements 18, and they are mounted in conventional sockets 123. Electrical connections to the sockets are made by conventional means, not shown.

Thermal sensors 126, 127 and 128 are spaced along an axis 129 which is generally parallel to axis 119. In the preferred embodiment, the thermal sensors are thermocouples mounted in susceptor 12, although other types of thermal sensors can be utilized if desired.

Means is provided for adjusting the amount of heat produced by the heating elements in accordance with the temperatures sensed by the thermal sensors. As illustrated, this means includes differential amplifiers 131–133 having their negative inputs connected to sensors 126–128, respectively. An adjustable reference voltage source 134 is connected to the positive input of amplifier 132. Adjustable bias voltage sources 136 and 137 are connected to the positive inputs of amplifiers 131 and 132, respectively for adding offset voltages to the signals produced by sensor 127.

The outputs of amplifiers 131–133 are connected to lamp controls 141–143 which control the energization of lamps 118a–118c, 118d–118e and 118g–118h, respectively. The output of amplifier 132 is also connected to additional adjustable bias sources 146 and 147. The outputs of these sources are connected to lamp controls 148 and 149 which control the intensity of lamps 122a and 122b, respectively.

Operation and use of the apparatus and control circuit of FIGS. 5 and 6 is generally similar to that described above. The temperature in the central region of the susceptor, as sensed by sensor 127, is set to a desired level by means of reference voltage source 134. The temperatures in the end regions, as sensed by sensors 126 and 128, are adjusted above or below the temperature in the central region by means of bias sources 136 and 137. The amount of heat produced by heating elements 122a and 122b is adjusted relative to the temperature in the central region by means of bias sources 146 and 147. Elements 122a and 122b are particularly useful for compensating for energy radiated from the edges of the susceptor. They can also be used to compensate for or to produce thermal gradients across the susceptor.

In the control circuit of FIG. 6, the operation of heating elements 122a and 122b is determined primarily by the temperature in the central region of the susceptor and secondarily by the adjustment of bias sources 146 and 147. If desired, the operation of elements 122a and 122b can be made wholly dependent on the temperature in the central region by connecting the output of amplifier 132 directly to lamp controls 148 and 149 and eliminating bias sources 146 and 147. Likewise, the adjustment of these elements can be made independent, if desired.

The invention has a number of important features and advantages. It permits temperature to be controlled and profiled as desired along angularly displaced axes, and it provides effective means for compensating for differences in the thickness of a susceptor, differences in emissivity on different sides of a susceptor, non-uniform gas flow in a reaction chamber, edge loss, localized cooling effects of an incoming gas, non-uniform emission from heating elements, and other factors which might otherwise produce undesired temperature variations. Although the invention has been described with specific reference to reactors of a type used in the manufacture of semiconductors, it will be understood that the invention can be utilized in other apparatus such as strip steel mills, belt furnaces, and the like. When used in a strip steel mill, the invention permits the rate of longitudinal temperature change to be programmed as desired, while maintaining the lateral or side-to-side temperature constant or permitting it, too, to be profiled as desired.

It is apparent from the foregoing that a new and improved temperature controlled profiling heater has been provided. While only the preferred embodiments have been described, as will be apparent to those familiar with the art, certain changes and modifications can be made without departing from the scope of the invention as defined by the following claims.

I claim:

1. In a temperature profiling heater:
   A. a chamber having at least two oppositely disposed walls formed of a material transparent to heat energy of a predetermined wavelength so that heat energy of that wavelength is transmitted through the walls without appreciable absorption thereby;
   B. a support member within the chamber having a generally planar surface for supporting material to be heated;
   C. first and second banks of electrically energized radiant heating elements outside the chamber and mounted in predetermined positions proximate to the walls of transparent material for producing radiant heat energy of the predetermined wavelength and transmitting said energy through said walls to predetermined regions within the chamber;
   D. said first and second banks including elongated heating elements spaced side-by-side along first and second angularly displaced axes in generally parallel planes on opposite sides of the chamber;

E. thermal sensing means for sensing the temperature in different regions in the support member; and F. electrical control means connected to the heating elements in each bank for adjusting the amount of heat energy produced by different ones of the heating elements to provide predetermined temperatures in each of the regions in the support member as indicated by the thermal sensing means.

2. The temperature profiling heater of claim 1 wherein the first and second axes lie in planes generally parallel to the planar surface of the support member.

3. The temperature profiling heater of claim 1 wherein the first and second axes are normal to each other.

4. The temperature profiling heater of claim 1 wherein the thermal sensing means includes a plurality of sensing elements carried by the support member along axes generally parallel to the first and second axes.

5. The temperature profiling heater of claim 1 wherein the control means includes means responsive to the thermal sensing means for maintaining the temperature in each region of the support member at a predetermined level.

6. The temperature profiling heater of claim 1 further including means for directing air toward the heating elements and chamber walls to cool the same.

7. In a temperature profiling heater:
A. a chamber having a wall formed of a material transparent to heat energy of a predetermined wavelength so that heat energy of that wavelength is transmitted through the wall without appreciable absorption thereby;
B. electrically energized radiant heating means mounted outside the chamber in a predetermined position proximate to the wall of transparent material for producing heat energy of the predetermined wavelength and transmitting said energy through the wall to a plurality of regions extending along angularly displaced axes within the chamber, said heating means being adjustable for independently controlling the amount of heat delivered along each of the angularly displaced axes;
C. thermal sensing means for sensing the temperature in the regions along angularly displaced axes within the chamber; and
D. electrical control means connected to the heating means for setting the amount of heat energy produced thereby to provide a predetermined temperature in each of the regions in the chamber as indicated by the thermal sensing means.

8. The temperature profiling heater of claim 7 wherein the the control means includes means responsive to the thermal sensing means for maintaining the temperature in each region where the temperature is sensed at a predetermined level.

9. The temperature profiling heater of claim 7 wherein the heating means comprises a plurality of heating elements spaced along axes which are generally parallel to the angularly displaced axes.

10. The temperature profiling heater of claim 9 wherein the heating elements are elongated high intensity lamps disposed side-by-side along the axes.

11. The temperature profiling heater of claim 7 wherein the angularly disposed axes are orthogonal.

12. The temperature profiling heater of claim 7 further including means for directing air toward the heating means and chamber wall to cool the same.

13. In a temperature profiling heater:
A. a chamber having at least one wall formed of a material transparent to heat energy of a predetermined wavelength so that heat energy of that wavelength is transmitted through the wall without appreciable absorption thereby;
B. a support member within the chamber having a generally planar surface for supporting material to be heated;
C. a plurality of elongated electrical heating elements mounted in predetermined positions outside the chamber and disposed side-by-side along an axis generally parallel to the surface of the support member and proximate to the wall of transparent material for producing radiant heat energy of the predetermined wavelength and transmitting said energy through the wall to predetermined regions within the chamber;
D. a plurality of thermal sensors each disposed for sensing the temperature of the support member in a different region along an axis generally parallel to the first named axis;
E. electrical control means connected to the heating elements for setting the amount of heat energy produced by different ones of the heating elements to provide predetermined temperatures in each of the regions in the support member as indicated by the thermal sensors; and
F. additional heating elements adjacent to two edges of the support member, said edges being generally parallel to the first named axis and said additional elements being elongated and disposed with their axes generally parallel to the edges.

14. The temperature profiling heater of claim 13 wherein the control means includes means responsive to the thermal sensors for maintaining the temperature in each region at a predetermined level.

* * * * *